Patented Oct. 25, 1932

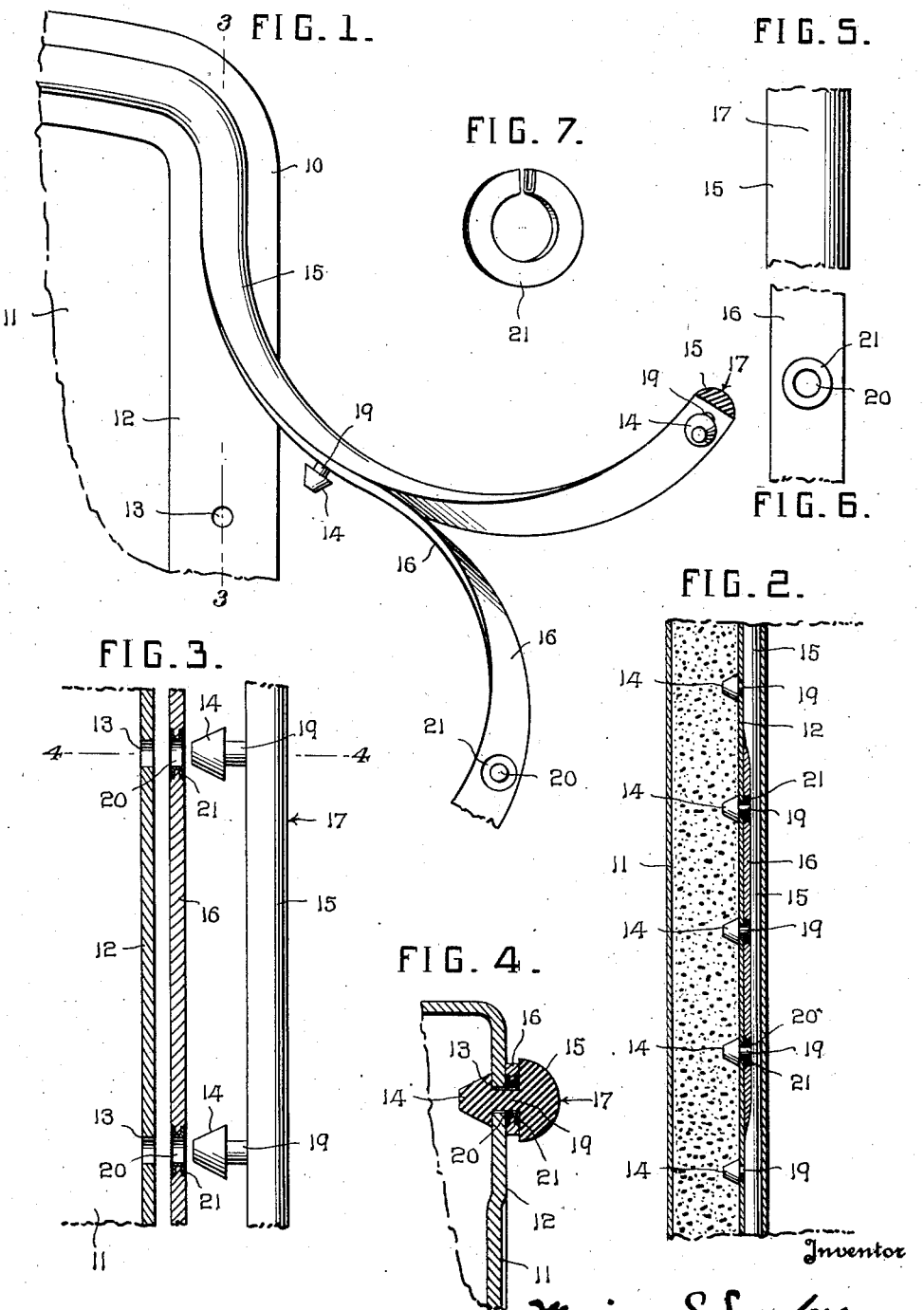

1,884,879

UNITED STATES PATENT OFFICE

MARION S. SANDERS, OF BRISTOL, VIRGINIA

GASKET

Application filed August 26, 1930. Serial No. 477,885.

This invention relates to gaskets for sealing closures such as windows, doors, automobile doors, refrigerator doors, furnace doors, and the like. More particularly the gasket is of the self attaching type of which the gasket carries its own securing means or projecting portions which are insertable through apertures in the closure member or a strip attached thereto whereby the gasket may be readily attached to and released from its carrying member.

The invention has for one of its objects to provide an underlying strip for the gasket which of itself is attached to the gasket by the securing means carried by the gasket which are afterwards insertable in the apertures of the carrying member. This intermediate or underlying strip is particularly advantageous when the gasket, which is of uniform construction in cross section throughout, is applied to a closure in which either parts, the carrying member or the member which the gasket is to engage, is warped or where the distance is too great for the gasket to form the proper seal between the parts; in such cases this strip provides an intermediate member, in such places to extend the gasket outwardly whereby the necessary sealing by the gasket may be accomplished.

Further features and objects of the invention will appear from the following description in conjunction with the accompanying drawing in which like characters of reference designate corresponding parts throughout the several views.

In the drawing:—

Figure 1 is an elevation of a portion of a refrigerator door showing the present invention partly applied thereto and partly extending and in detached relationship.

Figure 2 is a section of the portion of the refrigerator door closed showing a gasket in contact with the refrigerator wall with a gasket strip thereunder for a short distance.

Figure 3 is a section on line 3—3 of Figure 1 of a portion of the door and a side elevation of the parts in detached position.

Figure 4 is an enlarged sectional view on line 4—4 of Figure 3 with the parts assembled.

Figure 5 is an elevation of the gasket the same as in Figure 1, and just below it.

Figure 6 is an elevation of the underlying strip.

Figure 7 is a detail of the reinforcing eyelet for the underlying strip.

Referring to the drawing, Figure 1 shows a corner 10 of a refrigerator door 11 which may be warped outwardly from its proper plane. As in the rest of the door not shown the border portion 12 is provided with a series of spaced apertures 13 which are adapted to receive correspondingly spaced heads 14 on a gasket strip 15 so as to secure the gasket thereto. However in view of the fact that this portion of the door is warped or otherwise out of the plane of the remaining portion of the door so that gasket 15 by itself would be insufficient to effect an adequate seal, a supplemental strip 16 is provided so as to set gasket 15 out sufficiently for the purpose required.

Gasket 15 is preferably of substantially semi-cylindrical cross section, as shown best in Figure 4, of soft or sponge rubber or any desired material to provide a yieldable sealing gasket, the outer surface 17 being adapted to engage the side wall of the refrigerator or other member on which the gasket is used. On the inner flat side 18 of the gasket at spaced intervals are a series of heads 14 which may or may not be of the same material as the body portion of the gasket but are preferably flexible as well as the neck members 19 extended so as to pass through apertures 13 of the refrigerator door or other carrying member.

Strip 16 as shown, is preferably slightly narrower than gasket 15, see Figures 4, 5 and 6, and may be made of flexible packing material, reinforced rubber packing being indicated in Figures 2 and 3 and in practice has proven to be entirely satisfactory for the purpose; preferably strip 16 is of harder material than gasket 15 though soft material could be used,—cotton reinforced rubber and fiber materials such as bakelite, felt or linen covered rubber, etc., are also suitable. These strips, as stated, are punched or provided with apertures 20 corresponding to the positions of heads 14 on gasket 15 and where the material is in danger of breaking, the apertures may be provided with eyelets 21 or with reinforcing ring extending partly around the aperture of the character shown in detail in Figure 7 preferably of linen which may be glued or stitched in place in the apertures 20 through strip 16, or the eyelets can be made of leather, fiber, or metal eyelets positioned in the apertures by stamping and pressing with a regular eyelet machine. These eyelets are preferably pressed into the strip sufficiently so they will not project much if any above the surface thereof.

Eyelets 21 may be either completely annular members or of the character shown in Figure 6 so that when they are stamped or compressed into the apertures 20 of the strip there will be a small segment not covered by the eyelet. This facilitates positioning the eyelet in the aperture and in the manufacture of the strip without materially weakening the reinforcement; it also avoids the necessity of a machine to put in the eyelets, as a fiber or metal broken ring could be slipped in by hand.

In assembling the gasket and strip and heads 14 of the gasket 15 are first inserted through the apertures 20, or apertures 20 and eyelets 21, of strip 16 of the required thickness, or a plurality of such strips, so as to build the height of the gasket up the right amount to adequately seal the space between the gasket carrying member and member to be engaged thereby and then the heads 14 are inserted through apertures 13 of the carrier member. In this way the gasket carries the underlying strip by means of its securing members for securing it to the closure member to which it is afterwards attached. The necks 19 on the gasket are flexible enough or extensible so as to stretch for carrying either a thin strip 16 or plurality of such strips or the strips may be made in different thicknesses as $\frac{1}{16}''$, $\frac{3}{32}''$, $\frac{1}{8}''$, etc., to meet the requirements. After necks 19 are extended through strip 16 or a plurality of such strips it is still extensible enough to be inserted through apertures 13 of the carrying member and heads 14 thereon engage the inner face 22 thereof to maintain the gasket 15 carrying strip 16 assembled on the carrier member.

When the gasket and strip are applied to furnaces and the like it is essential, of course, that gasket 15 and heads 14 thereon be composed of noncombustible material, such as asbestos or other fire proof manufactured material, likewise the under-lying strip 16 is essentially of fire proof material such as asbestos or the like.

In Figure 2 of the drawing a short section of strip 16 is shown underlying the gasket 15 which is particularly desirable at the portion of the door where the latch member is mounted as it increases the thickness of the gasket in that position and thereby increases the buffing action of the gasket at that point.

What is claimed as the invention is:—

1. The combination with a gasket member having heads thereon at intervals for insertion through apertures in corresponding intervals in a carrying member to which the gasket is to be applied and shanks between said heads and gasket adapted to be extended, of an underlying strip having apertures therethrough at intervals corresponding with the heads on the gasket through which apertures the heads of the gasket are to be inserted to secure the underlying strip thereto before pressing the heads through the apertures in the carrying member as provided for by the extensible shanks.

2. The combination with a gasket for attachment to a carrier member of a closure, said gasket having attaching heads on the ends of extensible neck members between the head and gasket member for securing it to the closure, of a flexible strip having apertures therethrough corresponding with the heads and necks on the gasket through which apertures said heads are adapted to pass for securing the strip thereto prior to securing the strip to the carrier member of the closure which the gasket and strip are adapted to seal.

3. The combination set forth in claim 2, including the apertured underlying strip, and reinforcing members of U-shaped cross-section within the apertures of the strip.

4. The combination set forth in claim 2, including the apertured underlying strip, and reinforcing members of U-shaped cross-section within the apertures of the strip and covering all but a small segment of the periphery of the apertures.

5. The combination with a gasket comprising a longitudinal body member, of a flexible strip for under-lying the gasket and somewhat narrower than the gasket, and means integral with the gasket for jointly securing the gasket and under-lying strip to a closure member.

6. The combination with a closure including a carrier member apertured at spaced intervals and an engaging member, of a gasket having securing heads connected thereto by extensible shanks at corresponding spaced intervals, and an underlying strip having apertures corresponding to the securing heads on the gasket whereby the strip is secured thereto, said gasket also securing the underlying strip to the carrier member of the closure by the heads passing through said apertures, the outer surface of the gasket adapted to contact with the engaging member of the closure and to be provided with the underlying strip for at least a portion of the length of the gasket at positions where the space between the carrier member and the engaging member is too great for the gasket alone to provide an adequate sealing means therebetween.

7. The combination with a closure including a carrier member having apertures therein and an engaging member, of a gasket and an underlying strip having corresponding apertures therein and being extensive with the gasket for at least a portion of the length of the gasket, said gasket having heads connected to it by extensible shanks for securing the strip thereto and also for securing the gasket to the carrier member of the closure by passing said heads through the apertures, the outer surface of the gasket adapted to contact with the engaging member of the closure and to be provided with the underlying strip to provide for an increased buffing action of the gasket.

In testimony whereof I affix my signature.

MARION S. SANDERS.